(12) United States Patent
Crenshaw

(10) Patent No.: US 10,361,583 B2
(45) Date of Patent: *Jul. 23, 2019

(54) POWER OVER ETHERNET EMERGENCY LIGHTING SYSTEM AND METHOD OF DETECTING POWER LOSS OF A LINK SEGMENT THEREOF

(71) Applicant: IOTA ENGINEERING LLC, Tucson, AZ (US)

(72) Inventor: David Crenshaw, Tucson, AZ (US)

(73) Assignee: IOTA ENGINEERING LLC, Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/903,862

(22) Filed: Feb. 23, 2018

(65) Prior Publication Data

US 2018/0183264 A1 Jun. 28, 2018

Related U.S. Application Data

(63) Continuation of application No. 15/432,381, filed on Feb. 14, 2017, now Pat. No. 9,941,737, which is a continuation of application No. 15/073,492, filed on Mar. 17, 2016, now Pat. No. 9,609,706.

(60) Provisional application No. 62/135,006, filed on Mar. 18, 2015.

(51) Int. Cl.
| | |
|---|---|
| *H05B 37/00* | (2006.01) |
| *H02J 9/06* | (2006.01) |
| *H05B 33/08* | (2006.01) |
| *H05B 37/02* | (2006.01) |
| *H02J 7/00* | (2006.01) |
| *H04L 12/10* | (2006.01) |
| *H02J 9/04* | (2006.01) |

(52) U.S. Cl.
CPC ............ *H02J 9/061* (2013.01); *H02J 7/0021* (2013.01); *H02J 9/065* (2013.01); *H04L 12/10* (2013.01); *H05B 33/0803* (2013.01); *H05B 33/0815* (2013.01); *H05B 33/0818* (2013.01); *H05B 33/0887* (2013.01); *H05B 37/0263* (2013.01); *H02J 9/04* (2013.01); *H02J 9/06* (2013.01); *H02J 2009/068* (2013.01)

(58) Field of Classification Search
CPC ...... H02J 9/04; H02J 9/06; H02J 9/061; H02J 7/0021
USPC .......................... 315/86; 340/693.3; 307/64
See application file for complete search history.

(56) References Cited

U.S. PATENT DOCUMENTS

| | | |
|---|---|---|
| 2011/0133551 A1 | 6/2011 | Moller et al. |
| 2012/0104858 A1 | 5/2012 | Noe |
| 2015/0180276 A1* | 6/2015 | Kanarellis ................. H02J 9/00 307/66 |

FOREIGN PATENT DOCUMENTS

EP 2557657 A2 2/2013

OTHER PUBLICATIONS

Partial European Search Report issued in related European Patent Application EP16765785, dated Mar. 29, 2018, 3 pages.

* cited by examiner

*Primary Examiner* — Thuy V Tran
(74) *Attorney, Agent, or Firm* — Michael J. Curley; Quarles & Brady LLP

(57) ABSTRACT

A method for providing power over Ethernet emergency lighting is disclosed. The method includes detecting a loss of power over a POE link segment connected to a lighting fixture, and in response to the detection of a loss of power over the POE link segment, causing a relaying device to connect a lamp of the fixture to a backup battery.

11 Claims, 10 Drawing Sheets

POWER OVER ETHERNET EMERGENCY LIGHTING SYSTEM AND METHOD OF DETECTING POWER LOSS OF A LINK SEGMENT THEREOF

CROSS REFERENCE TO RELATED APPLICATIONS

This application is a continuation of U.S. patent application Ser. No. 15/432,381, filed on Feb. 14, 2017, issued as U.S. Pat. No. 9,941,737, which is a continuation of U.S. patent application Ser. No. 15/073,492, filed on Mar. 17, 2016, issued as U.S. Pat. No. 9,609,706 on Mar. 28, 2017, which claims the benefit of and priority to Provisional Application No. 62/135,006, filed on Mar. 18, 2015, the entire contents of which are hereby incorporated by reference herein, for all purposes.

TECHNICAL FIELD

The present invention relates to emergency lighting systems, and more particularly to providing emergency lighting systems powered by power over Ethernet ("POE") systems.

BACKGROUND ART

Lighting systems, particularly in commercial settings, are subject to a number of strict functional requirements set by various standard setting organizations. Among these is the requirement that emergency lighting be provided in the event of a loss of building power. These mandated emergency power systems must provide backup lighting for a predetermined period of time, must be tamper, fire, flood and earthquake resistant, and must meet certain other functional requirements. Conventionally, emergency lighting systems are provided as self-contained units installed in light fixtures, which include batteries charged by a dedicated A/C power line.

The promulgation of IEEE standards for power-over-Ethernet ("POE"), combined with the ubiquity of RJ45 Ethernet cabling in modern business and residential buildings, provides alternative means for building lighting. There are at present two ratified IEEE standards for POE: IEEE 802.3af and IEEE 802.3at. An Ethernet port operating in accordance with the IEEE 802.3af standard is capable of supplying 12.95 Watts to powered devices ("PDs") over a POE link. IEEE 802.3at defines the POE+ standard, which enables the delivery of up to 25.5 W over a POE link. Current efforts are underway to promulgate more advanced POE standards (e.g., POE+ and POE++), which will specify equipment capable of supplying up to 90 W over a POE link.

Realizing a POE link over the physical connections of Cat5+ Ethernet cable is done according to one of two alternatives, illustrated schematically in FIG. 1 As can be seen in FIG. 1, an RJ45 Ethernet cable 105 carries 8 conductors grouped as 4 twisted pairs (110a,b and 115a,b), with two twisted pairs (e.g., 110, 115) forming a communication link for a first port (transmit and receive), and with the two remaining twisted pairs available as spares (e.g., 115a,b). In Alternative A, a DC voltage is supplied over data lines, across center taps on internal signal coupling transformers (120 a,b) connected across the pair of conductors on each of the transmit and receive twisted pairs. The DC voltage is then supplied from the center taps of another pair of transformers (125 a,b) across the receive-side twisted pairs for the transmit and receive lines. This DC voltage is supplied to a powered device 130 on the receive end of the link. In Alternative B of the POE standard, DC voltage is supplied through the unused or spare twisted pairs. Newer and proposed POE standards provide more power and faster data using all 8 conductors. These methods require 4 Data transformers, where Power is imposed on all pairs.

In recent years, with the declining cost and increased efficiency of light emitting diodes ("LEDs"), LED lighting has begun to replace fluorescent lighting in commercial settings. FIG. 2 is a schematic representation of a conventional LED lighting installation powered by a POE link, or more precisely, an Ethernet cable referred to under the POE standards as a Port Data Link Segment. 48V DC nominal is supplied over the link by power sourcing equipment ("PSE") 205 (e.g., a POE switch, hub or midspan injector). The power is superimposed on data transmission wire pairs of an Ethernet link segment (e.g., 210a, b) carried on a CATnx (e.g., Cat 5+) cable. The link segments (210a,b) supply power to a Powered Device (PD), for example, POE luminaire Lighting LED Driver 220, where the power is intelligently extracted (i.e., separated from the data) at the PD. Power extraction occurs at a POE Lighting LED Driver 220, which appears to the PSE as any conventional PSE operating according to the POE standards. Power is then delivered by the driver 220 to LED lamps 225. In certain conventional implementations, driver 220 and LED lamps 225 are co-located in an LED luminaire 215, which is installed, for example at a ceiling light fixture.

In a typical AC Power System, certain luminaires (i.e., light fixtures) are designated as also emergency luminaires, which by code and accepted building practice must maintain illumination upon a loss of AC power. Luminaires are complete with all the necessary luminaire components; e.g., light sources (lamps, such as LEDs), a ballast or lamp power supply such as an LED driver), etc. If a luminaire is to also act as an emergency luminaire, it is outfitted with additional hardware enabling it to drive all or a portion of the light sources (i.e., lamps) for emergency illumination in emergency-mode operation—a condition triggered by the loss AC power. Thus, the existing lamps in these luminaires are used both for normal lighting when AC power is supplied, and also for illumination in emergency-mode operation when normal AC power fails.

SUMMARY OF THE INVENTION

The invention is directed to an emergency lighting luminaire powered by a POE network connection deployed, for example, in the context of existing POE lighting. Embodiments of the invention include a first power enabled Ethernet link segment, a rechargeable emergency battery pack, a normal lighting LED driver, an LED lamp, and a power loss monitor. In certain embodiments, the first power enabled Ethernet connects to a POE port link segment. Further, the rechargeable emergency battery pack contains a battery charger, a rechargeable battery, and an emergency LED driver, which is connected to one input of a relaying device. Moreover, the other input of the relaying device is electrically connected to a normal lighting LED driver, which drives an LED lighting array under normal operating conditions and the output of the relaying device is connected to the LED lamp.

Embodiments of the invention further include a power loss monitor, which determines whether power is being provided over the normal lighting LED driver or whether there has been an interruption of power. When the power loss monitor detects a loss of power from the normal lighting LED driver, a controller, which is connected to the power loss monitor, connects one input of the relaying device to the LED lamp. However, when the normal LED driver has power, the other input of the relaying device is connected to the LED lamp.

In certain embodiments, the emergency lighting luminaire further comprises a second POE input connectable to a power POE port link segment. When the first POE input is connected to the battery charger, the second POE input is connected to the normal lighting LED driver. Further, the first and second POE inputs are included in the emergency battery pack, which further includes a POE output that is connected to the second POE input by a pass-through loop. The POE output is also connected to the normal lighting LED driver. In other embodiments, the power loss monitor communicates with the normal lighting POE link pass-through loop.

In certain embodiments, the relaying device, adapted to form an electrical connection between the battery and the LED lighting array (or a stand-alone emergency LED array), is an electro-mechanical switch. In other embodiments, the relaying device is a solid-state device.

In certain embodiments, the POE emergency luminaire including the battery charged by a port link segment that is entirely independent from the port link segment driving normal lighting. In other embodiments, the system includes a battery charged with DC power via an auxiliary power output interface from the normal lighting LED driver, which itself is driven by a single POE port link segment. In other embodiments, the single POE port link segment supplies power to an emergency backup battery pack, which then supplies normal lighting power via a power bridge.

In certain embodiments, the power loss monitor is connected to a first conductor on a first POE data pair of a POE port link segment, and the power loss monitor is connected to a second conductor on a second data pair of the same POE port link segment. The power loss monitor capable of determining when a POE port link segment loses power, but without interfering with data communications on that link segment. In other embodiments, the power loss monitor further includes an opto-coupler, a resistor, and a Zener diode. The power loss monitor regulates current flowing through the LED of the opto-coupler based on whether the voltage differential between the first and second conductors exceeds a predetermined threshold. Further, the power loss monitor includes ferrite beads capable of filtering connected between the rectifying diode bridge and the first and second conductors. Moreover, the first and second conductors are connected to POE link segment over the first power over Ethernet input.

Embodiments of the invention also provides a system for providing emergency backup power in a POE luminaire, which has a connection to a POE link segment, a lamp driver and a lamp. The system further contains a power loss monitor connected to detect a loss of POE power in the POE link segment and an emergency backup battery and lamp driver connected to supply power to the lamp when the power loss monitor detects a loss of POE power in the POE link segment.

Moreover, embodiments of the invention provides a method of detecting power loss in a POE link segment, comprising the steps of detecting a differential DC voltage between a first conductor in a first data pair on a POE link segment and a second conductor in a second data pair on the same POE link segment. In certain embodiments, the step of detecting the differential DC voltage includes detecting a decrease in current through a measurement device when the differential DC voltage between a first conductor in a first data pair on a POE link segment and a second conductor in a second data pair on the same POE link segment drops below a predetermined threshold.

BRIEF DESCRIPTION OF THE DRAWINGS

The invention will be more fully understood by referring to the following Detailed Description of Specific Embodiments in conjunction with the Drawings, which are embedded in the Detailed Description below.

DETAILED DESCRIPTION OF SPECIFIC EMBODIMENTS

Figure 1:
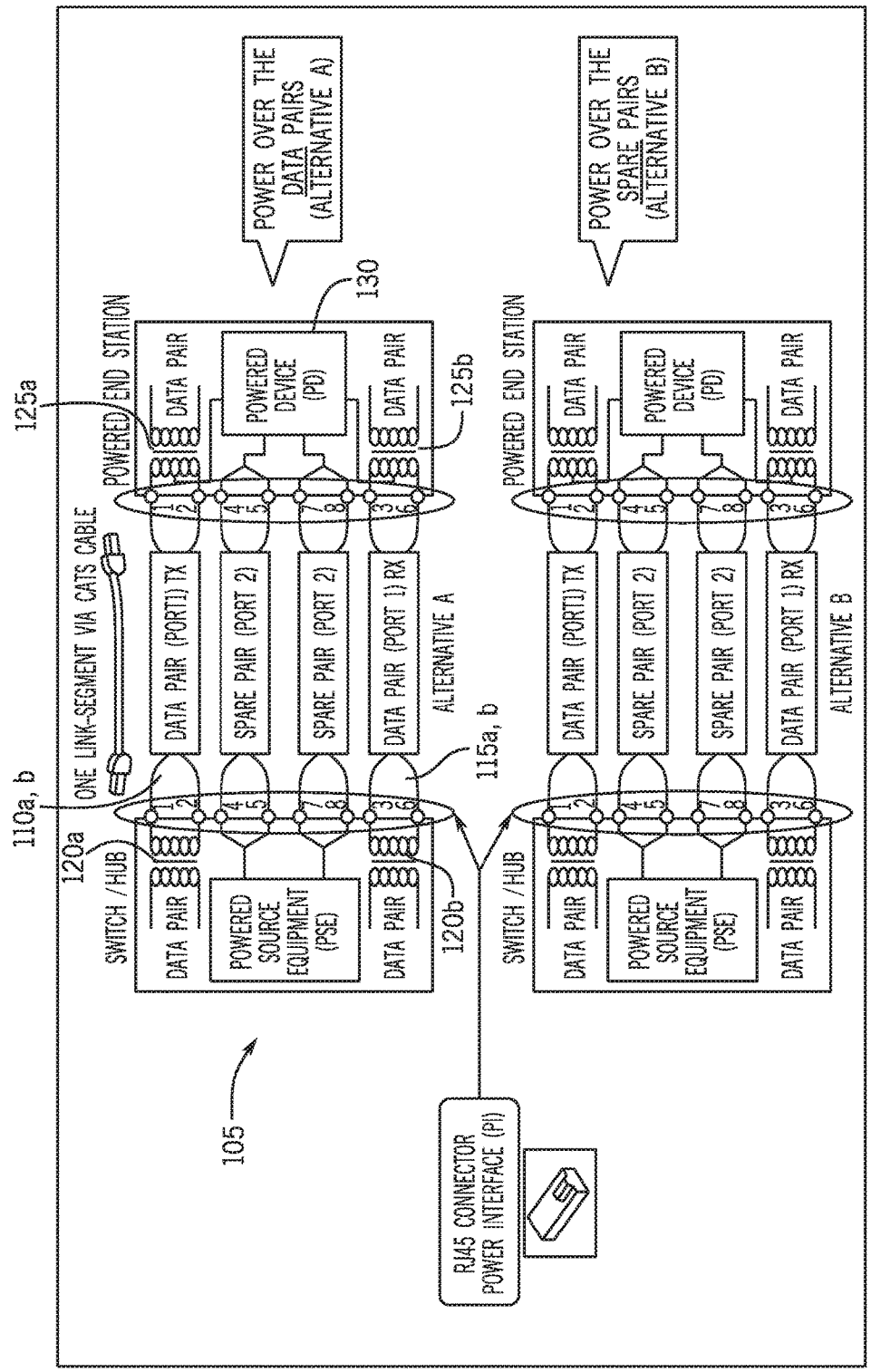
FIG. 1 is a schematic illustration of a conventional Power-over-Ethernet link.
Figure 2:
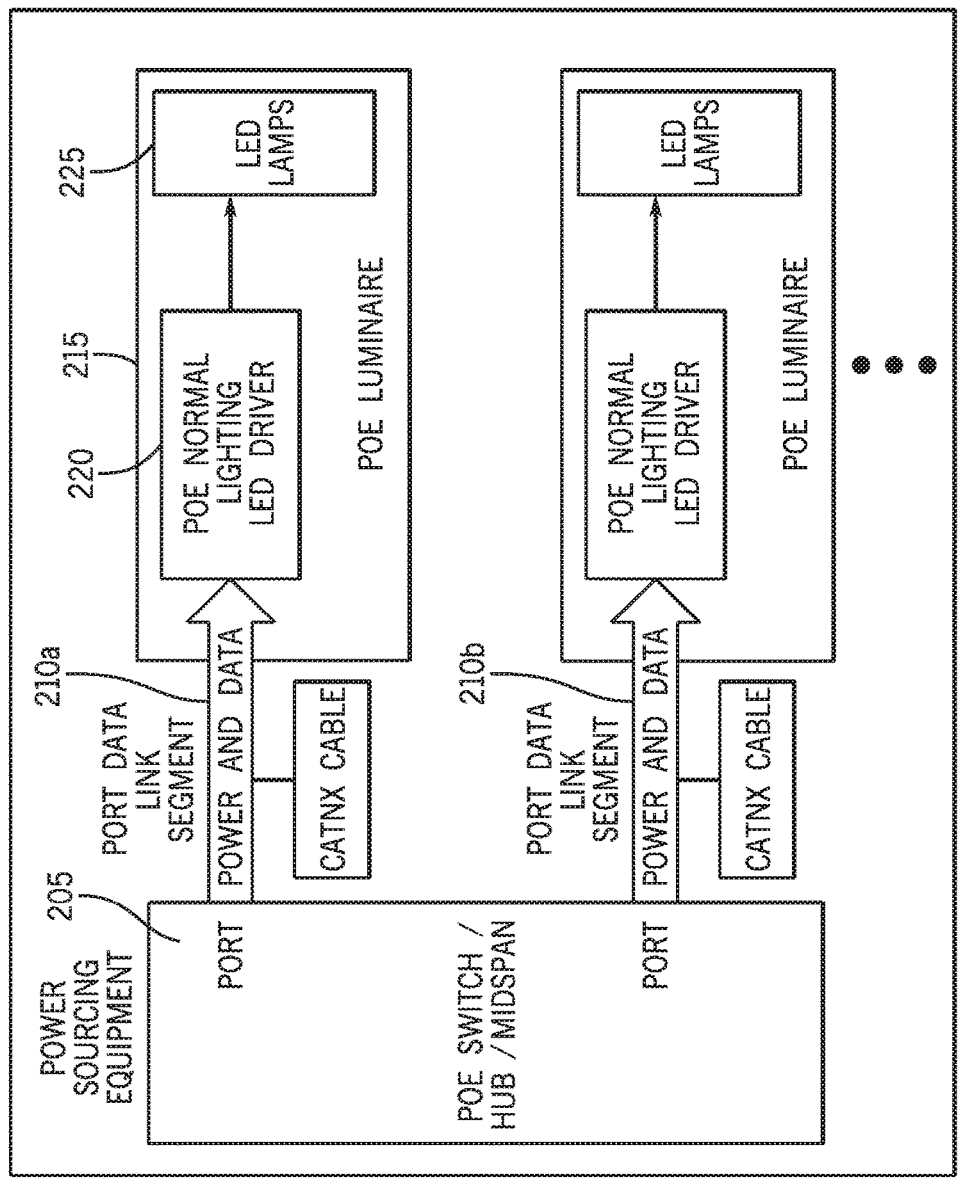
FIG. 2 is a schematic illustration of a conventional LED-based POE lighting system.

A detailed description of preferred embodiments of the invention is set forth below.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In addition, the following disclosure may describe features of the invention with reference to corresponding drawings, in which like numbers represent the same or similar elements wherever possible. In the drawings, the depicted structural elements are generally not to scale, and certain components are enlarged relative to the other components for purposes of emphasis and understanding. It is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed.

Figure 3:
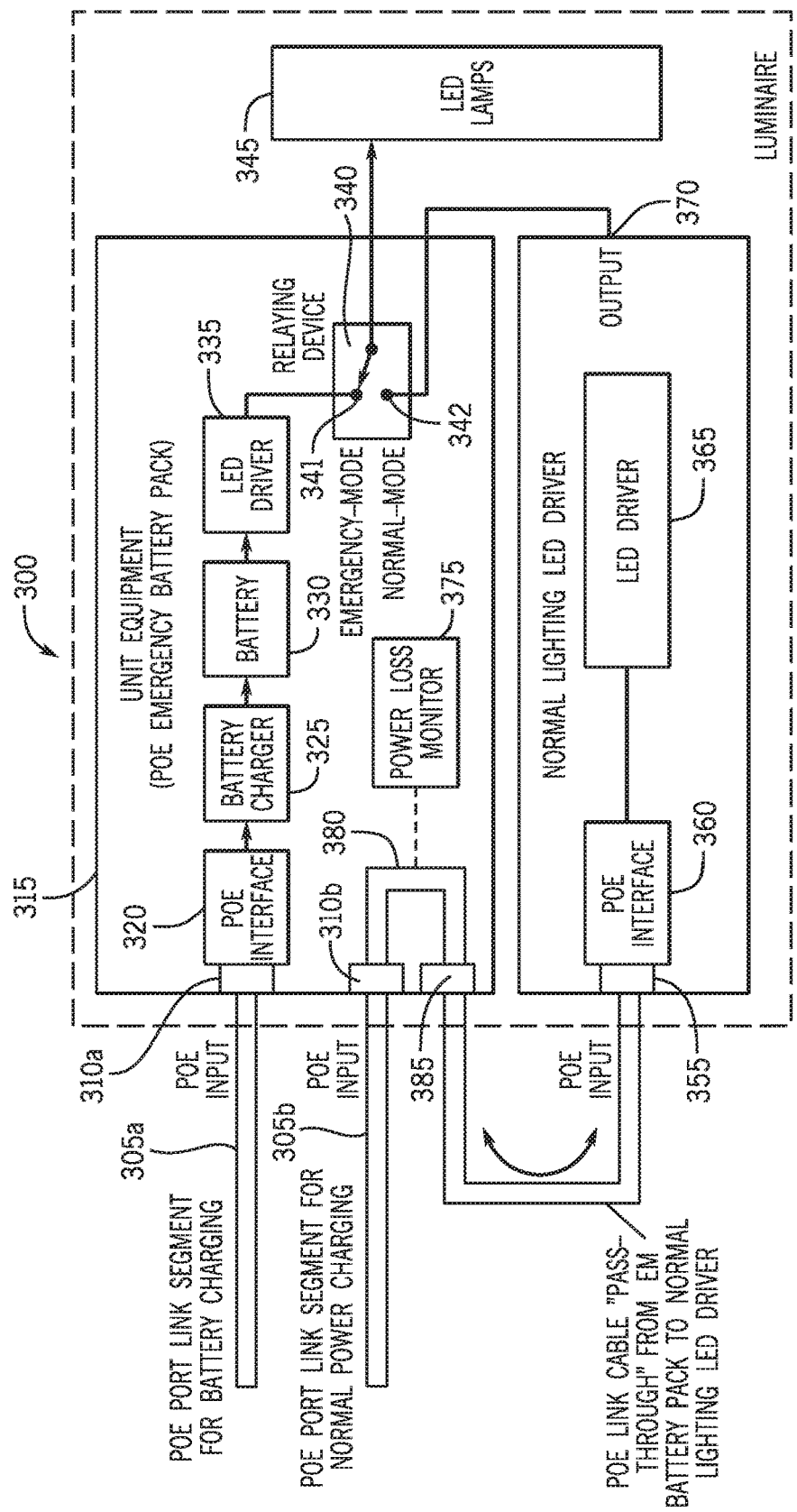
FIG. 3 is a schematic illustration of a POE emergency lighting luminaire having two POE port links according to an embodiment of the invention.

FIG. 3 shows an emergency POE luminaire 300 using two POE port link segments 305a, b. The luminaire 300 includes two POE inputs 310a, b, each POE input being connected respectively to a POE port link segment 305a, b. POE port link segments 305a, b are connected to unillustrated power sourcing equipment, such as a POE enabled such, hub or midspan (i.e., injector). Both POE inputs 310a, b are electrically connected to POE emergency battery pack 315. Battery pack 315 includes POE interface 320, which is connected to a first POE port link segment 310a via input 305a. Battery pack 315 also includes a battery charger 325, battery 330, and LED driver 335. POE interface 320 extracts DC power (supplied, for example, as 48 Vdc) from the POE port link segment 310a, and supplies that power to battery charger 325. Battery charger 325 steps down the voltage supplied by POE interface 320 and performs certain current conditioning functions.

Figure 9:
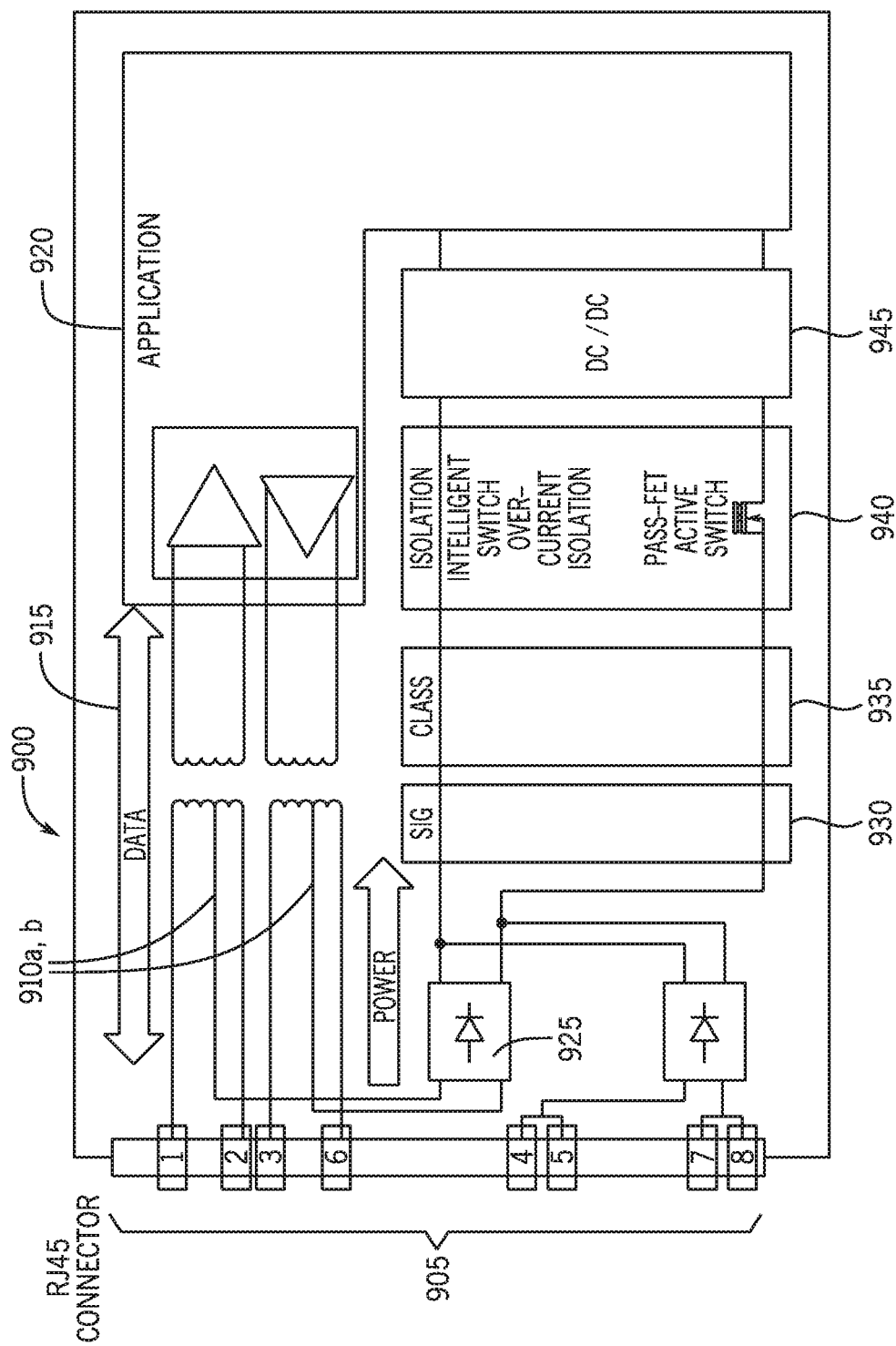
FIG. 9 is a schematic diagram of a POE interface according to the invention.

An exemplary POE interface suitable for use as POE interface 320 is illustrated in additional detail in FIG. 9. The POE interface 900 of FIG. 9 performs several functions. First, it extracts DC power from RJ45 connector 905 via the center-tap of the data transformers 910a, b which are connected on the primary-side to a POE link segment. Additionally, POE interface functions to separate data flow 915 from power flow and to couple both data and power to the application 920 (i.e., the functional components of the PD containing the POE interface). POE interface 900 includes an RJ45 connector 905, data transformers 910a, b with center-tap primary, bridge rectifier(s) 925, signature circuitry 930, classification circuitry 935, an intelligent switch over-current isolation "active-switch" with pass-FET 940, and a DC/DC isolation power converter 945.

After the POE interface 900 extracts DC power from the RJ45 connector via the center-taps of the data transformers 910a, b, the power is coupled to an input diode bridge 925 which protects the circuitry within the PD from being connected to a reverse polarity input voltage by accepting either positive or negative polarity inputs. Power is then "intelligently" supplied to the PD by the PSE (connected on the other side of the POE link segment) via a communications protocol via the "physical" (PHY) layer compliant to the IEEE 802.3xx standard. DC power is supplied by the PSE at a nominal target voltage of 48 Vdc. The "power-up" process follows a sequence where, once a PD is connected to the end of the POE Link Segment via the RJ45 connector 905, the PSE starts to raise the voltage from 0 Vdc based on the IEEE 802.3xx standard, with predetermined levels, timing, and current detection. The sequence follows from left-to-right, from Signature to Classification to Isolation to DC/DC to Application.

The first phase of the sequence (detection) of the powering sequence occurs when the PSE polls the connected PD to determine if it provides the correct impedance signature. The PSE accomplishes this by ramping up a current limited (5 mA) detection voltage (from 2.5 V to 10 V) across the designated pairs of CAT-x wires (at about a 2 ms repetition rate) and measuring the voltage and the current at the end of the ramp time. If the PSE detects the proper signature impedance in accordance with the IEEE 802.3xx standard, it determines that there is a valid PD at the end of the link. The PSE then proceeds to the next step in the process—Classification. Classification is the process where the PD "indicates" to the PSE the required power range it will need. There are 5 categories (classes). During classification, the PSE induces 15.5-20.5 Vdc, limited to 100 mA, for a period of 10 to 75 ms responded by a certain current consumption by the PD, indicating its power class. The sequence advances to the next step where the PSE raises the voltage to 34 Vdc, and the PD "closes" the "Turn-on" switch (the Pass-FET in 940) but slowly controls inrush current consumption (of over 350 mA) within 50 ms. Once this step is completed, the PSE ramps the voltage up to 48 Vdc for the DC/DC isolation power converter 945 to supply power to the application 920. The application 920 for the POE emergency battery pack of FIG. 3 is battery charger 325.

Battery charger 325 is a high-frequency switch-mode power supply, designed to manage battery charging according to the battery charge capacity, size, terminal voltage, type, and other influencing factors with regards to energy usage and regional market regulations or restrictions. In certain embodiments, battery charger 325 is an isolated "Flyback" topology high-frequency switch-mode current source type with digital over analog control. Other topologies are used in other embodiments to best manage the chosen battery, such as, a "Buck" converter or a "Buck-boost" converter, or other topology, and either current sourcing or current-over-voltage sourcing may be used during the charging process, pulse-charge or linear-charge, constant-rate or multi-rate. Battery charger 325 may be designed to charge different types of batteries, such as, NiCd, NiMH, Pb-based, or Li-based. Where battery 330 is a NiCd battery, battery charger 325 is a "smart-charger" capable of supplying 1 to 3 Watts of power during recharge phase, and less than 1 Watt during maintenance-mode charging. In normal operation battery charger 325 provides a trickle charge, (supplied at 1.2 to 20 Vdc and a nominal current range of between 30 mA and 300 mA for typical NiCd type batteries; however, these voltage and current values depend on the type, pack design, and charge state of battery 330) to battery 330.

Battery 330 supplies DC power to LED driver 335 at 2.4 to 24 Vdc, with the most typical voltages 6 to 19.2 Vdc depending on the type of LED luminaire 345. In certain embodiments, battery 330 is a rechargeable NiCd battery having a reserve capacity of 2.5 to 3.0 amp-hours at 6 to 19.2 Vdc. Other embodiments use other battery types, such as NiCd batteries having a reserve capacity of 1.5 to 4.0 amp-hours at 2.4 to 24 Vdc (1.2 Vdc/cell), or Lithium iron phosphate (LiFePO4) batteries having a reserve capacity of 0.5 to 3.0 amp-hours at 3.0 to 3.6 Vdc/cell.

In certain embodiments, LED driver 335 is a switch-mode power converter that powers the LED lamp(s) with power (Energy/time) provided by battery 330, and supplies DC current at a nominal 0.08 to 2.0 A over a voltage range from 10 to 60 Vdc to LED lamps 345 via relaying device 340. The LED current supplied in these embodiments is a pure DC current, or DC current with low AC ripple.

In alternative embodiments, LED driver 335 is a DC-DC "Flyback" topology high-frequency switch-mode power supply with Pulse-Width Modulation (PWM) control (digital or analog), where the output Voltage or Current or Power are regulated. In these embodiments, PWM current is passed through the LEDs. Other topologies are used in other embodiments, such as, a "Buck" converter or a "Buck-boost" converter, or Half-Bridge converter, or Full-Bridge converter, or other topology. The typical LED power levels for Emergency-Mode operation range from 3 to 25 Watts, with other power levels possible. The typical LED voltage ranges from 10 to 60 Vdc for Class 2 operation, with other voltages possible.

LED lamps 345 vary in operating voltage, current, power, and light output, depending on the embodiment. The typical LED lamps for LED fixtures are offered over a large range of different types for large area lighting range in voltage from 10 to 60 Vdc for Class 2, and higher voltages for non-class 2. LED fixture lamp arrays & modules operate over a wide range of current levels from 0.08 Adc to 3 Adc. Color temperatures for LED lamps 345 range from 2500 K (warm-white) to 6000 K (bright-white), depending on the embodiment.

Relaying device 340, in one embodiment, is an electromechanical switch that alternatively couples one of two inputs (341, connected to emergency battery pack 315, or 342, connected to normal lighting LED driver 350) to LED lamps 345. Use of an electromechanical switch as relaying device 340 is advantageous because it results in near-zero insertion loss for battery pack 315, i.e., when battery pack 315 is not connected, normal lighting LED driver 350 is connected to led lamps 345 with minimal electrical resistance. This invention or any embodiments are not limited to only an electromechanical switch as the relaying device, alternate relaying devices such as diodes or solid-state switches or other types are possible and within the scope of the invention.

POE power link segment 305b is electrically connected through the battery pack's second POE input 305b to normal lighting LED driver 350 via normal lighting POE input 355. Normal lighting LED driver 350 includes a POE interface 360, which extracts DC power available on the second POE link segment 310b (i.e., 48 Vdc), and supplies it to LED driver 365. Like emergency backup LED driver 335, LED driver 365 has different operating parameters depending on the embodiment. In one embodiment, LED driver 365 is optimized to operate over a large range of voltages from 10 to 60 Vdc for Class 2, and higher voltages for non-class 2. Such a driver can supply a large range of current levels operate over a wide range of current levels from 0.08 Adc to 3 Adc. The POE power levels are limited currently to about 55 Watts each, however, with future developments allowing up to near 90 Watts, additional higher power LED drivers and higher power luminaires are possible and within the scope of the invention. LED driver 365 is electrically connected through output 370 to an input of relaying device 340, and then, depending on the state of relaying device 340, to LED lamps 345.

In normal lighting operation, LED lamps 345 are driven from normal lighting LED driver 350, which takes DC power from power link segment 305b, which is supplied in a pass-through fashion through emergency battery pack 315. Emergency battery pack 315 further includes a power loss monitor 375, which monitors the status of power being supplied to the second POE input 305b by monitoring pass-through loop 380 between the second POE input 305b and POE output 385. POE output 385 is in turn connected to normal lighting driver POE input 355.

When the luminaire 300 of FIG. 3 is in normal lighting mode, relaying device 340 is set such that its second input 342 is electrically connected to LED Lamps 345. This results in current being supplied from normal LED lighting driver 350 to LED lamps 345. As will be discussed further in relation to the battery pack of FIG. 4, when power loss monitor 375 detects a power down condition on pass-through loop 380, relaying device 340 switches states such that its first input 341, which is connected to emergency LED driver 335 to LED lamps 345.

The luminaire described with respect to FIG. 3 has certain advantages. Because the luminaire uses two, independent POE link segments, one for charging the backup battery and another for driving the LED lamps under normal lighting conditions, the luminaire of FIG. 3 minimizes the likelihood of corrupting or otherwise interfering with the fidelity of data being transmitted or received over the second POE link segment 305b. This may be helpful if link segment 305b is being used for communication as well as for the supply of DC power. Moreover, existing lighting and building codes, for example, NFPA 70 National Electrical Code, NFPA 101 Life-Safety code, and UL 924 Standard for Safety Emergency Lighting and Power Equipment, require that, for emergency backup lighting, unswitched power (i.e., normal lighting power), be monitored at the entry point of a luminaire. This is accomplished in the luminaire of FIG. 3, because power loss is monitored at input 310b to luminaire 300. This arrangement is also advantageous because it locates all critical components of the emergency luminaire within the luminaire, which minimizes the risk of hazards that might cause failure of the emergency lighting luminaire due to tampering, smoke, flood, fire, icing, vandalism, or other adverse conditions.

Figure 4:
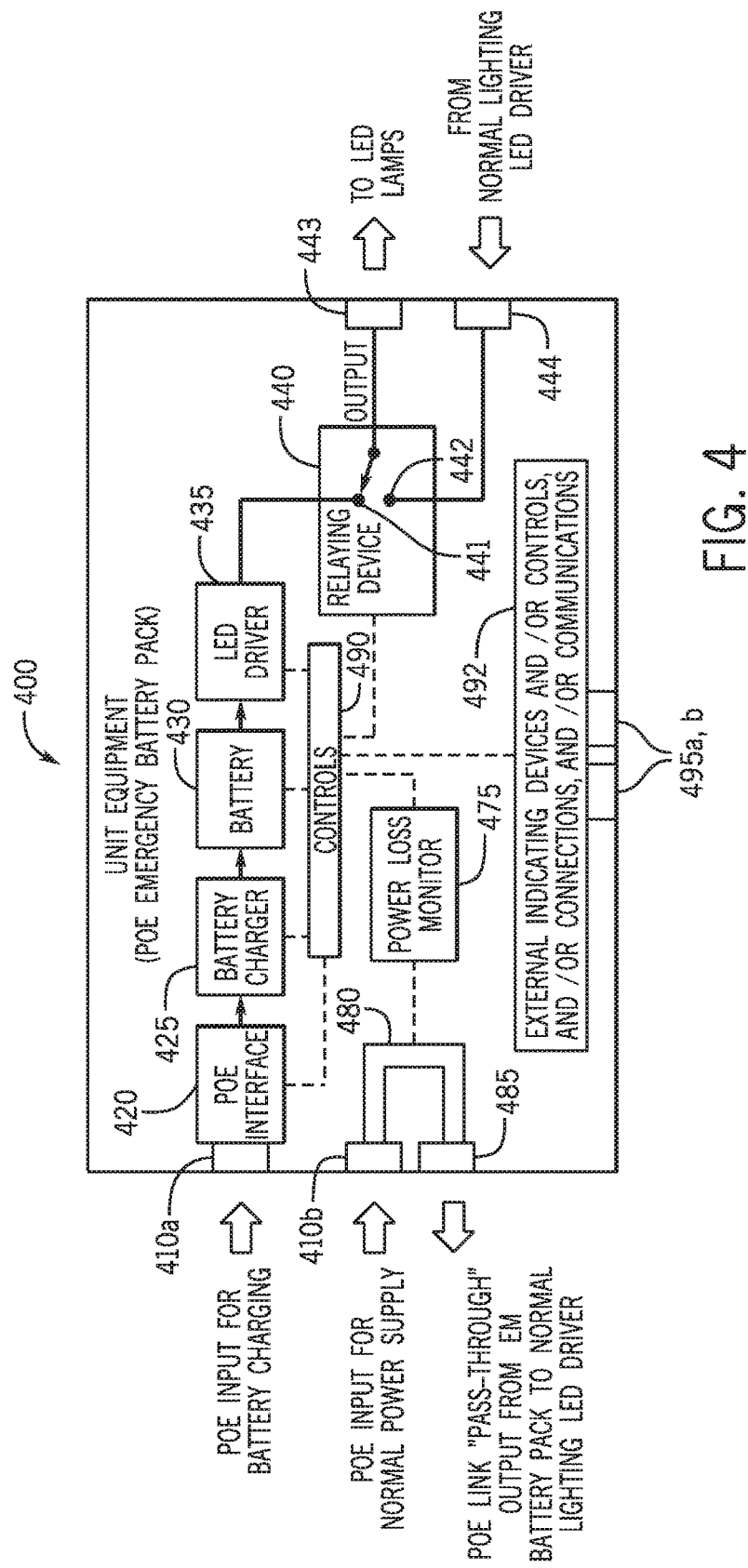
FIG. 4 is a schematic illustration of an emergency POE battery pack for use with the luminaire of FIG. 3.

FIG. 4 schematically illustrates an emergency battery pack 400 useable in a luminaire having two independent POE links, for example, luminaire 300 discussed above in reference to FIG. 3. The battery pack 400 includes two POE inputs, one for battery charging 410a, and a second for power for normal operation conditions 410b, which is passed through battery pack 400 to a POE output 485. The charging POE input is connected to POE interface 420, which extracts DC power from the connected POE link and supplies that power to battery charger 425. Battery charger 425, in normal operating conditions, charges battery 430. Battery 430 supplies LED driver 435, which is connected to a first input 441 of a relaying device 440, which in certain embodiments is an electromechanical switch. Relaying device 440 alternatively connects either its first input 441 or its second input 442 to an output 443 electrically coupled to non-illustrated LED lamps. Second input 442 of relaying device 440 is connected to input 444, which when battery pack 400 is installed, receives normal lighting power from a normal lighting LED driver.

The battery pack 400 of FIG. 4 also includes a power loss monitor 475, which detects a loss of power on pass-through loop 480. Upon detection of a loss of power by power loss monitor 475, a controller 490, which in certain embodiments is a microprocessor in communication with a non-illustrated memory, switches relaying device 440 such that its first input 441 is connected to output of the battery pack 443. Controller 490, in certain embodiments, includes additional functionality. For example, upon detecting a power loss condition, controller may send a signal via I/O ports 495a, b to an external or internal signaling or indication device, indicating the detection of power loss conditions. In certain embodiments, controller 490 sends a derangement signal to one of ports 495a, b upon detection of a loss of normal lighting power. In some embodiments, derangement signal illuminates an LED to alert users that the emergency lighting system has been triggered. In some embodiments, controller 490 sends additional data communications signals to ports 495a, b to be connected to other external devices, for example, over Ethernet links connected to ports 495a, b. Such signals may inform remote Ethernet connected devices of the status of battery pack 400, the occurrence of a power loss condition, and any other useful information. Controller 490 also optionally receives input control signals via ports 495a, b. Exemplary input control signals include test signals to simulate a power loss condition to test the functionality of battery pack 400, or status queries for controller 490. In certain embodiments, controller 490 communicates with other external devices such as a normal lighting LED driver (e.g., 350 in FIG. 3) or a data logger.

Figure 5:
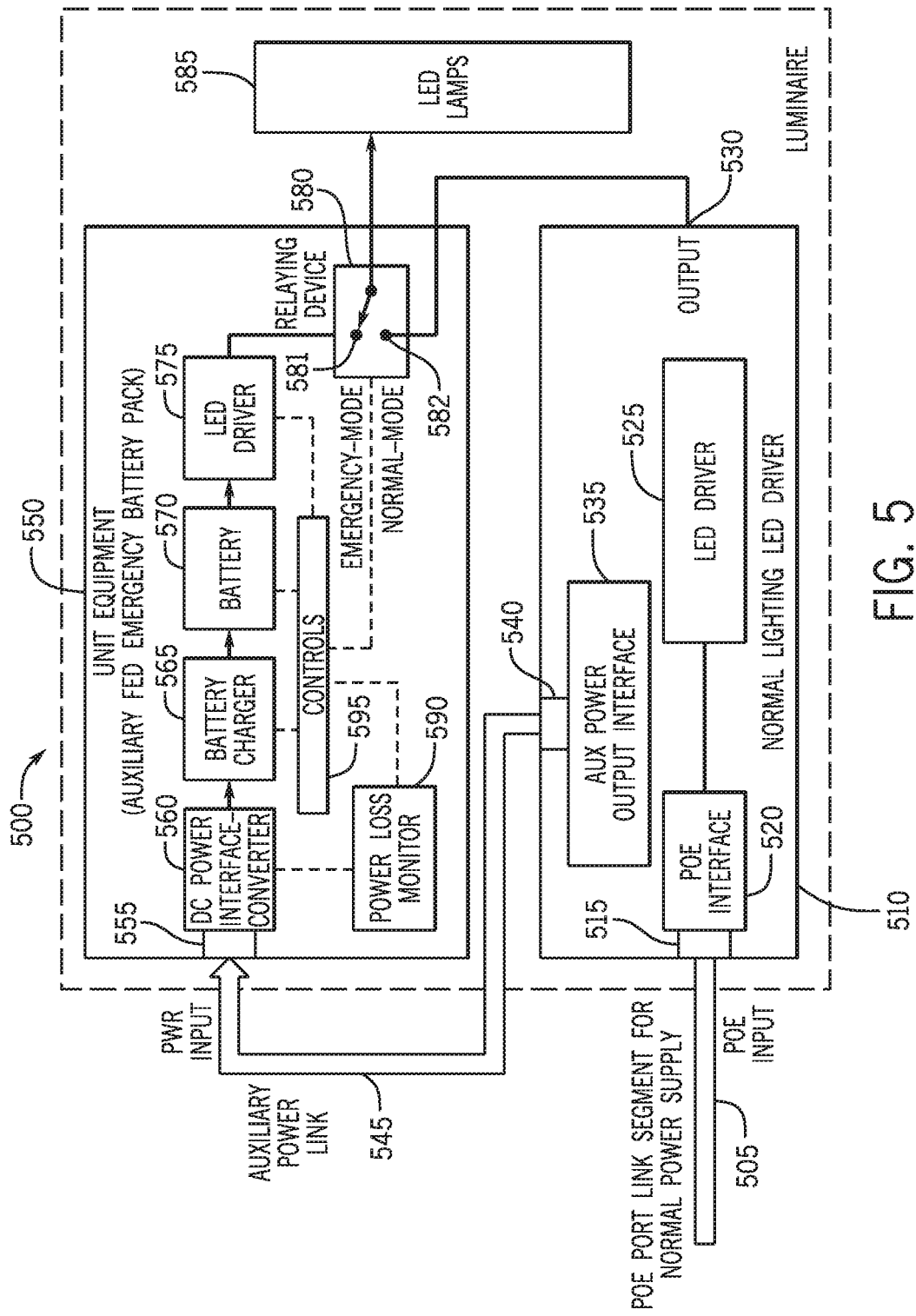
FIG. 5 is a schematic illustration of a POE emergency lighting luminaire using an auxiliary power link according to an embodiment of the invention.

FIG. 5 is a schematic illustration of an alternative embodiment of a luminaire using an emergency lighting battery pack fed by auxiliary power directed from a normal lighting LED driver. Unlike the embodiment of FIG. 3, the embodiment of FIG. 5 relies on only a single POE port link segment 505, with supplies DC power (as well as data communications, in some embodiments) to normal lighting LED driver 510 through POE input 515. As in the embodiment of FIG. 3, POE interface 520 extracts DC power from POE link segment 505 and supplies it to LED driver 520. In normal lighting operating conditions, LED driver 525 supplies driving current to LED lamps 585 through driver output 530 and first input 582 of relaying device 580, which will be described in further detail in connection with battery pack 550.

The embodiment of FIG. 5 also includes battery pack 550 for supplying emergency power to LED lamps 585 in the event of a power loss condition in normal LED lighting driver. Like the embodiment of FIG. 3, battery pack 550 includes a battery charger 565, which charges battery 570, which drives LED driver 575. The output of LED driver 575 is connected to a first input 581 of relaying device 580, which alternatively connects its first or second inputs 581, 582 to LED lamps 585, such that power can be switched from normal lighting LED driver 530 to battery pack 550 in the event of the detection of a normal lighting power loss condition.

Unlike the embodiment of FIG. 3, the luminaire 500 of FIG. 5 does not use two POE link segments. Instead, a one-port method is enabled by extracting a low level of DC power from the normal lighting power supplied to normal lighting LED driver 510 by an auxiliary power output interface 535. This power is extracted from the POE fed DC supply being coupled to an aux power output interface 535 after the POE Interface 520 has separated Data flow from Power flow, or in other implementations at any point before or after the interface. In one embodiment, DC power (0 to 3W) is extracted at the nominal POE voltage of 48 Vdc (36-57 Vdc range) on POE input 515 to driver 510, and is supplied via output 540, auxiliary power link 545 and power input 555 to battery pack 550. The DC power interface converter 560 controls (i.e., by limiting in-rush current, filtering noise bi-directionally, and buffering) the 48 Vdc supply that feeds the supplied power to operate Battery Charger 565.

In accordance with this arrangement, the input voltage of the Battery Charger 565, in one embodiment, is a nominal 48 Vdc (36-57 Vdc range). The output voltage of the Battery Charger 565, in the same embodiment, typically floats to the nominal battery voltage of Battery 570 of 9.6 Vdc +/−20% fully charged, or simply Vbatt_float for other particular batteries. Chargers in other embodiments are capable of supporting other battery voltages within a typical range of between 2.4 and 24 Vdc. The battery charge current is dependent on charge level, time, application, and battery type, ranging from 0.0 Adc (no charge current) up to 1C, where C is the battery charge capacity equivalent current expressed in Adc. Values of C supported by embodiments of the invention include 1.2 A, 1.5 A, 2 A, 2.2 A, 2.5 A, 3 A, 3.5 A, 4 A, with C=3 A being the most typical for POE lighting.

The input of the LED Driver 575 is coupled to the Battery 570 at the battery nominal terminal voltage +/−20% and ranges to 1 V/cell at the end of the discharge cycle. In a typical embodiment, the typical battery voltage, fully charged, is approximately 9.6 Vdc for an 8-Cell NiCd battery. The input current of the LED Driver 575 is dependent on battery voltage, output power, and efficiency. The typical input current of the LED Driver 575 is approximately 1.7 Adc for a 9.6 Vdc battery voltage.

For emergency-mode operation LED driver 575 is connected to first input 581 of relaying device 580, which connects to LED lamps 585. The LED Driver 575 is capable of driving LED lamps 585 over a large range of voltages from 10 to 60 Vdc for Class 2, and higher voltages for non-class 2, and over a large range ranging from 0.08 Adc to 2 Adc, with higher current levels possible in the future. The POE power levels are limited currently to about 55 Watts each, however, with future developments allowing up to near 90 Watts.

In the embodiment of FIG. 5, a normal lighting loss of power is detected by power loss monitor 590 in battery back 550. In this embodiment, loss of power at normal lighting LED driver 510 (for example, because power has been lost on POE port link segment 505 results in loss of power on auxiliary power link 545 such that the power loss can be detected at battery pack 550. This maintains the advantages of the system described in reference to FIG. 3, where power may be lost at any point up to the luminaire without impacting the functionality of the emergency illumination system.

As in the embodiment of FIG. 4, the battery pack 550 includes controller 595, which, at least, switches relaying device 580 in response to detection of a power loss condition. Controller 595 optionally has additional functions in additional embodiments, which are described more fully below in reference to FIG. 6.

Figure 6:
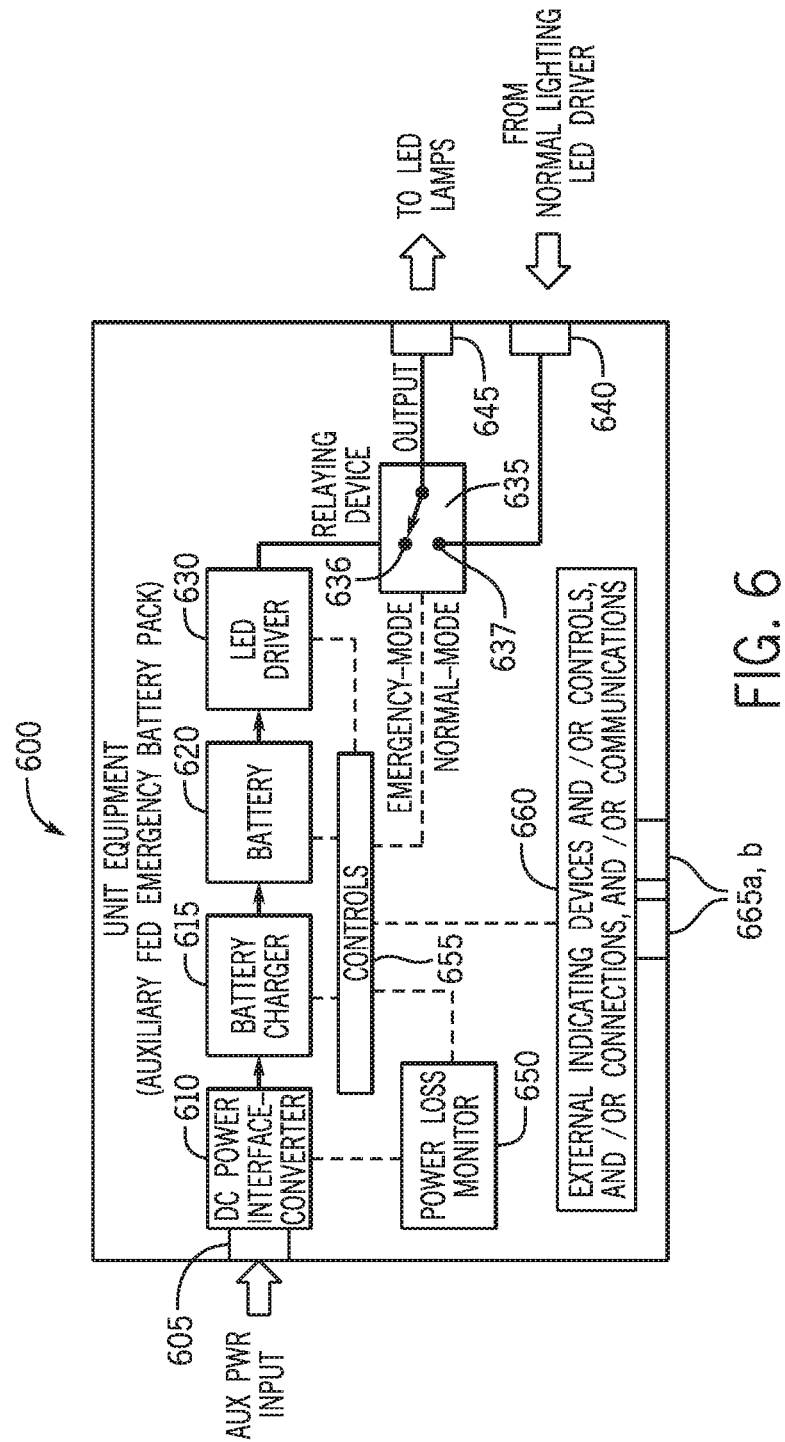
FIG. 6 is a schematic illustration of an emergency POE battery pack for use with the luminaire of FIG. 5.

FIG. 6 schematically illustrates an emergency battery pack 600 useable in a luminaire having one POE port link segment, for example, luminaire 500 discussed above in reference to FIG. 5. Like the battery pack described in FIG. 4, battery pack 600 includes controller 655, but also includes I/O ports 665a, b for two-way communications with external devices, for example, for receiving test signals and status queries, and for sending status data and a derangement signal in the case of a power loss condition.

Figure 7:
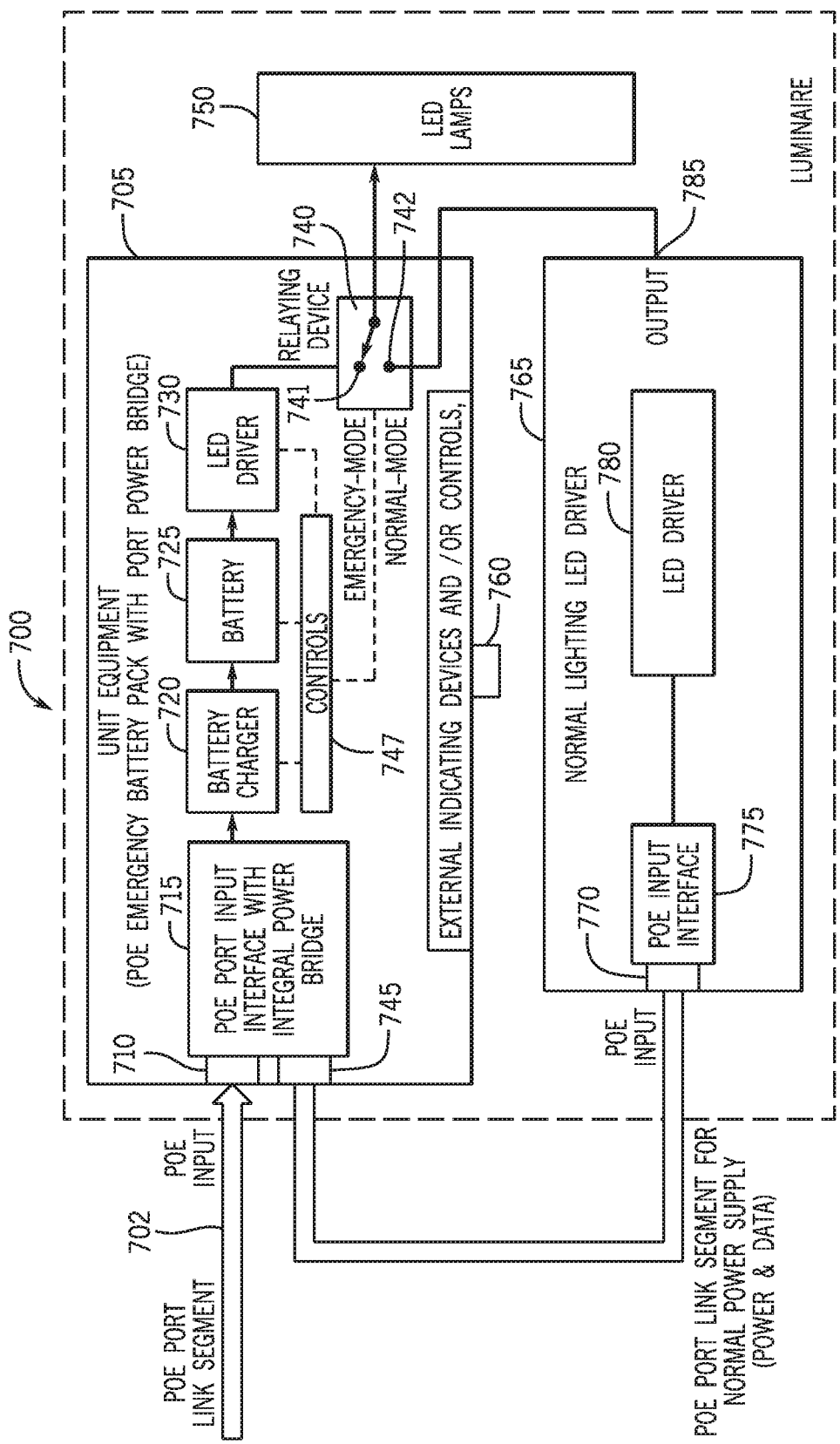
FIG. 7 is a schematic illustration of a POE emergency lighting luminaire using a port power bridge according to an embodiment of the invention.

FIG. 7 schematically illustrates a POE backup luminaire 700 according to another embodiment of the invention. In the embodiment of FIG. 7, like that of FIG. 5, the luminaire receives power over a single POE port link segment 702. Unlike the embodiment of FIG. 5, POE link segment 702 is first connected directly to battery pack 705. A POE port interface with integral power bridge ("IIPB") 715 extracts a low level of DC power to provide to battery charger 720, which charges battery 725, to supply LED driver with power to drive LED lamps 750 in the event of a power loss condition as has been described.

IIPB 715 operates to provide an isolated data link, as will as a DC power link from link segment 702 to the normal lighting LED driver. IIPB also extracts or bridges a low level amount of power from link segment 702 to battery charger 720. From a systems level perspective, link segment 702 is a dedicated link segment for normal lighting purposes, data and power over one single link segment. IIPB 715 enables the capability to maintain this single-purpose usage, while power is used also to power the battery charger 720. Power is provided from the PSE normal power supply via link segment 702 to the normal lighting LED driver 705 according to the IEEE 802.xx POE standard, which supports active and intelligent communication between the PSE normal power supply and the normal lighting LED driver 705. IIPB 715 is an intelligent power extractor, extracting a low level of power from the normal lighting POE link segment to provide power to battery charger 720, in such a way so as to not disturb or interfere with the data communications or the power flow between the PSE and the normal lighting driver 705. Each POE port link segment is intended as a dedicated link between the PSE and the PD (in this case, the normal lighting LED driver). The IIPB is transparent in this process and does not communicate over the POE Port Link Segment 702.

As in previous embodiments, controller 747 detects a power loss condition and switches relaying device 740 to connect battery 725 to led lamps 750. Unlike in previously described embodiments, a power loss condition is detected in the battery pack 705. Power loss monitoring is a shared function, with initial monitoring integrally within the IIPB 715, and additionally supported by the electronic Controls 747.

Figure 8:
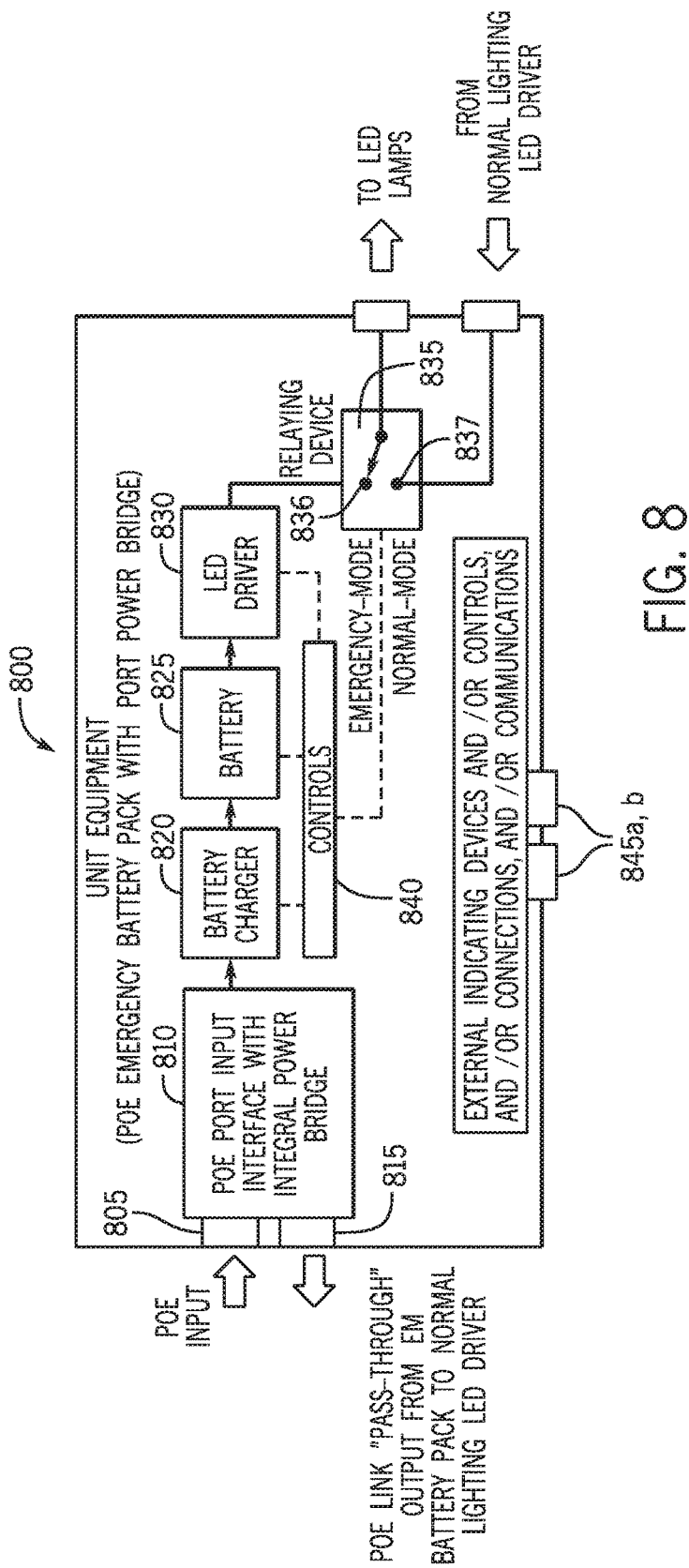
FIG. 8 is a schematic illustration of an emergency POE battery pack for use with the luminaire of FIG. 7.

FIG. 8 schematically illustrates an emergency battery pack 800 having a power bridge 810, useable in a luminaire having one POE port link segment connected to input 805. Such a luminaire is usable as a battery pack in, for example, luminaire 700 discussed above in reference to FIG. 7. Like the battery pack described in FIGS. 4 and 6, battery pack 800 includes controller 840, but also includes I/O ports 845a, b for two-way communications with external devices, for example, for receiving test signals and status queries, and for sending status data and a derangement signal in the case of a power loss condition.

Figure 10:
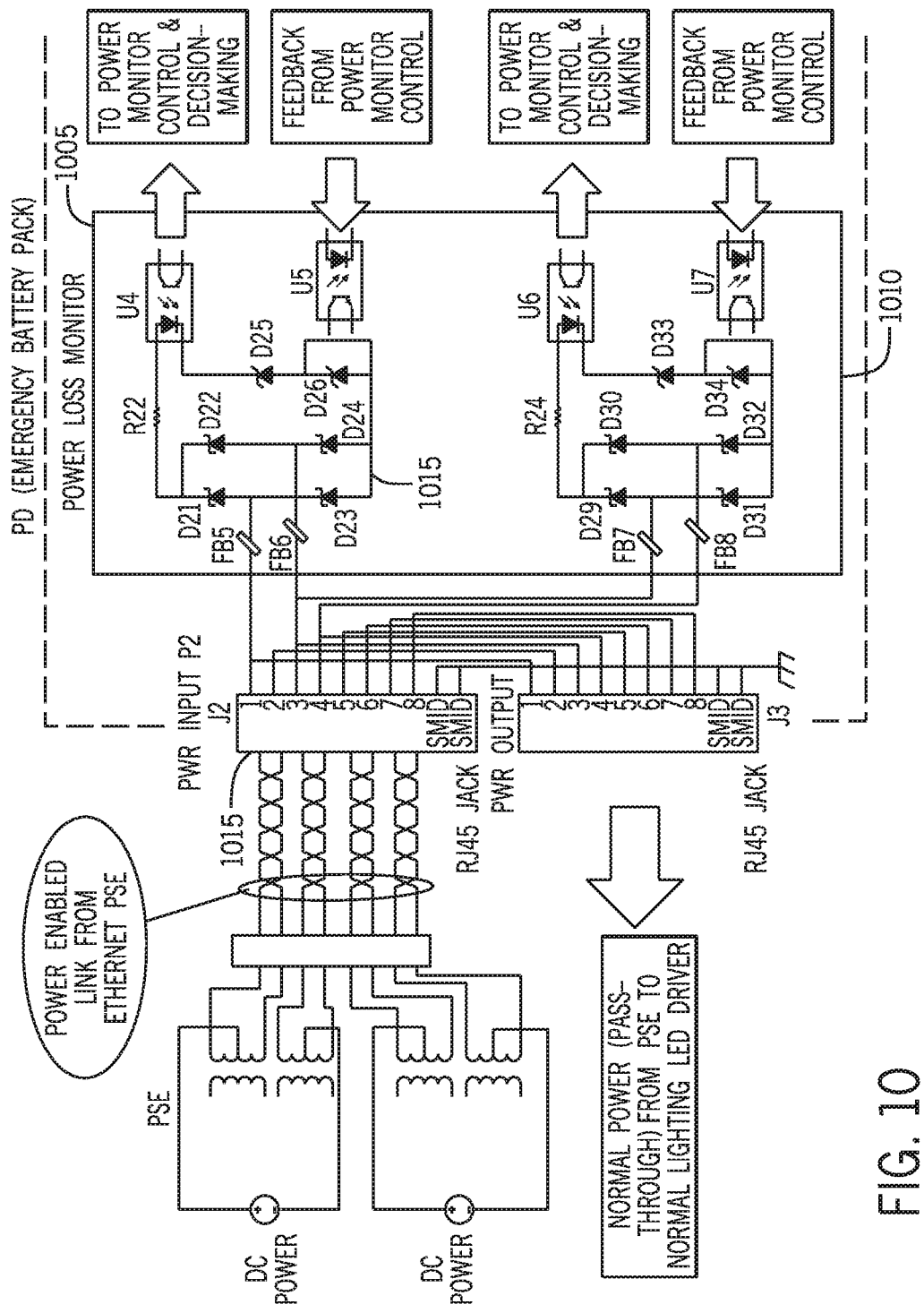
FIG. 10 is a circuit diagram of a power loss monitor according to an embodiment of the invention.

FIG. 10 illustrates a pair of power loss monitor circuits, each of which is usable for the power loss monitor 375 described above in reference to FIG. 3. FIG. 10 illustrates two circuits, 1005, which detects power loss on Port 1 (between pins 1 and 3) of an attached RJ45 POE cable 1015, and 1010, which detects power loss on Port 2 of the same cable (between pins 4 and 7). In the discussion to follow, reference will be made to the Port 1 circuit 1005 primarily, which involves circuit components R22, D21-D24, D25, D26, U4, U5, FB5, and FB6; however, it should be understood that the discussion likewise applies to the adjacent circuit 1010 for Port 2.

As is set forth above with respect to FIG. 1, power extraction in POE typically occurs on a powered device's data transformer (e.g., 125a and 125b in FIG. 1), specifically from the "center-tap" of a twisted pair transformer winding (the PD data transformer primary). As shown in FIG. 1, these terminations (referenced to the RJ45 connector) are pin sets (1,2-3,6) and (4,5-7,8). Turning now to FIG. 3, because the luminaire of FIG. 3 uses two separate POE links (a separate dedicated emergency link for battery charging and a separate link for the normal lighting LED driver), access to the PD data transformer (located at POE interface 360, for example) for the normal lighting POE link is not provided for the power loss monitor (e.g., 375). Embodiments of the invention solve this problem by recognizing that the POE voltage is DC and of equal value (ideally) on each of the pin-pairs; i.e., Vpin1=Vpin2, and Vpin3=Vpin6, etc. Therefore, the nominal voltage Vpin1−Vpin3=+/−48 Vdc. Likewise, the nominal voltage Vpin2−Vpin6=+/−48 Vdc. Likewise, the nominal voltage Vpin4−Vpin7=+/−48 Vdc. Likewise, the nominal voltage Vpin5−Vpin8=+/−48 Vdc. A terminating circuit across any of these pin-sets (i.e., any pair of pins, where each pin is associated with its own twisted pair in the cable) is then used to measure and detect the power on a given port. Minimum data interference can be achieved because the resulting dc current i_monitor is relatively low and is of a common mode dc signal.

One novel advantage of this method and system of detecting a loss of POE power is the minimization of noise and interference that is achievable by DC current flow differentially only between two pair sets (across the supply terminals differentially imposed) rather than across any one digital data pair. The low level DC current is imposed as a common-mode current for each data pair, but is differentially imposed between data pair sets. The data pairs respond only to differential signals within the pair, and reject common-mode signals. Furthermore, data signals are AC, differential-mode for each twisted pair; therefore, AC interference to the data signals is minimized by the "non-differential-mode" of i_monitor, rather it is common-mode DC across pair sets. What is more, this power loss monitor connectivity method remains valid for both Alternatives A or B shown in FIG. 1.

In the circuits of FIG. 10, port power "On" or "Off" is detected by Opto-Coupler U5 (or like-wise U6 on port 2), where the output signal is a digital signal—Port power "On" status results in current flow in the Opto-Coupler sufficient to drive the output transistor of the opto-coupler to the "On" state. The Opto-Coupler is a "High-Gain" device, where minimum current through the opto-coupler's input LED is desired, which allows for the detection of power on with very low power use. Additionally, opto-coupler U5 provides galvanic isolation (isolating functional sections of electrical systems to prevent direct current flow), which provides maximum prevention of noise interference between circuits.

In the circuits of FIG. 10, current is provided through the opto-coupler U5 via bridge rectifier 915, resulting in the power loss monitor being compatible for each of the possible polarity implementations (see D21-D24 of circuit 1005 of FIG. 10).

The circuit of FIG. 10 includes two Zener diodes in series (D25, D26) connected to opto-coupler U5 as shown. The first Zener diode D25 is connected in series with the Opto-Coupler's input LED, which provides intended current flow only when the port input operating voltage exceeds the D25's breakdown voltage (Vb), thereby providing a voltage reference means. When the voltage across a D25 exceeds its Vb value, D25 "turns on" and passes current according to the familiar I-V curve for a Zener diode, causing current flow to increase sharply as the voltage continues to rise above Vb. In the arrangement of FIG. 10, as the POE port input operating voltage rises from 0 Vdc up to the nominal value of 48 Vdc, the component values are selected such that at the desired port voltage the circuit "turns on" sharply allowing current to flow and then to increase in magnitude as the input port voltage exceeds Vb. In this manner, the POE power "On" threshold voltage (the minimum Input Operating Voltage of 37 Vdc) is "measured" and a circuit response is initiated. Zener diode D25 and its functions are understood by those skilled in the art to be easily implemented additionally utilizing Integrated Circuits and programmable devices.

As can be seen in FIG. 10, the circuit additional and optionally includes a series resistor R22, the Opto-Coupler's input LED, and the two series Zener Diodes D25, D26. The total Zener diode breakdown voltages (the two Zener diode Vb values together) are selected to set the circuit response (the point at which the digital output of the Opto-coupler U5 changes states). Therefore, the circuit comprised of series resistor R22, the Opto-Coupler, and the two series Zener Diodes (D25 & D26), form a functional Analog-to-Digital converter.

The circuit of FIG. 10 additional and optionally includes certain features that provide hysteresis. Hysteresis is the time-based function of a system's output on present and past input variables. The dependence arises because the history affects the value of an internal state. To predict its future output state, either its internal state or its history must be known. In the circuit of FIG. 10, as the input voltage approaches the circuit "threshold voltage," there becomes an increasing depletion of "noise immunity" where the output state change as a function of the input voltage level becomes highly unstable. The design of FIG. 10 provides sufficient values of hysteresis to mitigate against circuit response instability and ambiguity.

The circuit of FIG. 10 includes an isolated hysteresis sub-circuit, comprised of components D26, U5, and feedback from non-illustrated Power Monitoring Control circuitry, contained, for example, in the controllers described above. Isolation is accomplished by use of Opto-coupler U5. Hysteresis is accomplished by setting the "turn-on" voltage level higher than the "turn-off" voltage level. An exemplary method of accomplishing this, implemented in one embodiment of the invention, is to first split the total Zener diode breakdown voltage Vb_total into two separate Zener diodes (D25 & D26). The breakdown voltage Vb_D26 is a small fraction of the total; furthermore, Vb_D26<Vb_D25. As the port input voltage rises from 0 to 48 Vdc, with the circuit "turn-on" threshold voltage set at 37 Vdc, the Opto-coupler responds with a circuit response by changing digital states on its output transistor. The output of Opto-coupler U4 feeds a monitor and a control circuit which then couples back into the Power Loss Monitor in the form of information feedback via Opto-coupler U5. The output of U5 (a transistor) is connected to bypass Zener Diode D26. As U5 changes states from "off" to "on," its output transistor diverts current flow around D26, collapsing the D26 Zener voltage to near zero volts. The total Zener Diode breakdown voltage is thus reduced by the value of Vb_D26. The circuit "threshold" voltage is reset to a lower voltage (30 Vdc), known as the "Falling input voltage." The output state of Opto-coupler U4 will not change states until the input voltage is falling and decreases to less than 30 Vdc. The differential voltage between "turn-on" (37 Vdc) and the "turn-off" voltage (30 Vdc) is 7 V, and is referred to as the hysteresis voltage.

The power loss monitor circuit of FIG. 10 also includes features to attenuate cross talk and filter noise. Ferrite beads FB5 & FB6 are placed such that they function as low-pass filters, attenuating high-frequency noise energy. They are in effect series inductors in the circuit. Therefore, the ferrite beads block high-frequency current, enabling attenuation of high-frequency noise coupled into the data pairs.

While the preferred embodiments of the present invention have been illustrated in detail, it should be apparent that modifications and adaptations to those embodiments may occur to one skilled in the art without departing from the scope of the present invention.

What is claimed is:

1. A method of supplying backup lighting power to a power over Ethernet ("POE") fixture, comprising:
    detecting a loss of power over a POE link segment connected to the fixture, and
    in response to the detection of a loss of power over the POE link segment, causing a relaying device to connect a lamp of the fixture to a backup battery.

2. The method of claim 1, wherein detecting a loss of power over a POE link segment comprises detecting a voltage differential between a first and a second conductor on the same POE link segment.

3. The method of claim 2, wherein the voltage differential is a DC voltage differential.

4. The method of claim 2, wherein the first conductor on the POE link segment is associated with a first data pair, and the second conductor on the same POE link segment is associated with a second data pair.

5. The method of claim 4, wherein detecting a loss of power over a POE link segment comprises detecting a DC voltage differential between a conductor on a first data pair and a second data pair.

6. The method of claim 2, further including the step of rectifying DC voltages detected on the first and second conductors on the same POE link segment.

7. The method of claim 1, further including the step of charging the backup battery using power supplied by the POE link segment.

8. The method of claim 1, wherein detecting the loss of power over a POE link segment comprises detecting the loss of power over a POE link segment connected to supply normal lighting power to a lamp of the fixture.

9. The method of claim 8, further including the step of, at the relaying device, disconnecting the lamp from the POE link segment.

10. The method of claim 1, wherein detecting the loss of power over a POE link segment comprises detecting the loss of power over a POE link segment not connected to supply normal lighting power to a lamp of the fixture.

11. A method of supplying backup lighting power to a power over Ethernet ("POE") fixture, comprising:
    detecting a loss of power over a POE link segment connected to the fixture, and
    in response to the detection of a loss of power over the POE link segment, causing a relaying device to connect a lamp of the fixture to a backup battery, wherein
    detecting a loss of power over a POE link segment comprises detecting a DC voltage differential between a first and a second conductor on the same POE link segment;
    the first conductor on the POE link segment is associated with a first data pair, and the second conductor on the same POE link segment is associated with a second data pair, and
    detecting a DC voltage differential between a conductor on a first data pair and a second data pair comprises detecting a decrease in current through a measurement device when the differential DC voltage between the conductor on the first data pair and the conductor on the second data pair drops below a predetermined threshold.

* * * * *